United States Patent
Lee

(10) Patent No.: US 10,122,532 B2
(45) Date of Patent: Nov. 6, 2018

(54) SECURITY VERIFICATION APPARATUS USING BIOMETRIC INFORMATION AND SECURITY VERIFICATION METHOD

(71) Applicant: SAMSUNG ELECTRONICS, CO., LTD., Suwon-si, Gyeonggi-do (KR)

(72) Inventor: Hee Bum Lee, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 135 days.

(21) Appl. No.: 15/176,460

(22) Filed: Jun. 8, 2016

(65) Prior Publication Data

US 2017/0093577 A1    Mar. 30, 2017

(30) Foreign Application Priority Data

Sep. 30, 2015    (KR) .......................... 10-2015-0138044

(51) Int. Cl.
| | | |
|---|---|---|
| *G06F 21/00* | (2013.01) | |
| *H04L 9/32* | (2006.01) | |
| *H04L 9/06* | (2006.01) | |
| *H04L 9/08* | (2006.01) | |

(52) U.S. Cl.
CPC .............. *H04L 9/3231* (2013.01); *H04L 9/06* (2013.01); *H04L 9/0819* (2013.01); *H04L 9/0838* (2013.01); *H04L 9/3263* (2013.01)

(58) Field of Classification Search
CPC ... H04L 9/3231; H04L 9/0838; H04L 9/0819; H04L 9/3263; H04L 9/06
See application file for complete search history.

(56) References Cited

U.S. PATENT DOCUMENTS

| | | | | |
|---|---|---|---|---|
| 6,118,873 A * | 9/2000 | Lotspiech | .............. | H04N 7/163 |
| | | | | 348/E7.056 |
| 8,321,672 B2 * | 11/2012 | Asano | ................... | H04L 9/3273 |
| | | | | 713/156 |
| 9,032,501 B1 * | 5/2015 | Martin | ................. | H04L 9/3213 |
| | | | | 726/10 |
| 9,544,277 B1 * | 1/2017 | Marshall | ............. | H04L 63/0435 |
| 9,679,197 B1 * | 6/2017 | Sills | .................... | G06K 9/00389 |
| 9,813,246 B2 * | 11/2017 | Schwach | ............... | H04L 9/3231 |
| 2002/0095587 A1 * | 7/2002 | Doyle | ................. | G06Q 20/341 |
| | | | | 713/186 |

(Continued)

FOREIGN PATENT DOCUMENTS

| | | | |
|---|---|---|---|
| KR | 10-2003-0045419 A | 6/2003 | |
| KR | 10-2003-0049643 A | 6/2003 | |

(Continued)

*Primary Examiner* — David Garcia Cervetti
(74) *Attorney, Agent, or Firm* — F. Chau & Associates, LLC

(57) ABSTRACT

A security verification apparatus using biometric information and a security verification method are described. The security verification apparatus includes a sensor configured to acquire images of biometric information of a user, and scramble the images of the biometric information by using a received key matrix. The security verification apparatus further includes an information processor configured to generate the key matrix by using a random key, transmit the key matrix to the sensor, decode data of the scrambled images received from the sensor by using the key matrix, and verify the user.

19 Claims, 4 Drawing Sheets

(56) References Cited

U.S. PATENT DOCUMENTS

| | | | |
|---|---|---|---|
| 2002/0095604 A1* | 7/2002 | Hausler | H04L 9/0861 380/255 |
| 2002/0124176 A1* | 9/2002 | Epstein | G06Q 20/341 713/186 |
| 2004/0081334 A1* | 4/2004 | Hayashi | H04L 9/0836 382/100 |
| 2004/0141613 A1* | 7/2004 | Hayashi | H04K 1/00 380/28 |
| 2004/0153674 A1* | 8/2004 | Hayashi | H04L 9/0836 380/217 |
| 2005/0071646 A1 | 3/2005 | Hollingshead | |
| 2005/0179955 A1* | 8/2005 | Shovgenyuk | G07D 7/0006 358/3.28 |
| 2006/0018467 A1* | 1/2006 | Steinmetz | G06F 21/34 380/54 |
| 2006/0193491 A1* | 8/2006 | Nakamura | G06T 1/0028 382/100 |
| 2007/0195998 A1* | 8/2007 | Le Saint | G06F 21/32 382/115 |
| 2007/0226514 A1* | 9/2007 | Maletsky | G06F 21/32 713/186 |
| 2007/0226515 A1* | 9/2007 | Maletsky | G06F 21/32 713/186 |
| 2007/0237366 A1* | 10/2007 | Maletsky | G07C 9/00158 382/115 |
| 2008/0215890 A1* | 9/2008 | Buer | H04L 9/3231 713/186 |
| 2008/0270796 A1* | 10/2008 | Suu | G06F 21/105 713/169 |
| 2008/0304664 A1* | 12/2008 | Suthaharan | H04L 9/0662 380/46 |
| 2009/0064296 A1* | 3/2009 | Aikawa | G06F 21/32 726/6 |
| 2009/0274344 A1* | 11/2009 | Bringer | G06K 9/00006 382/115 |
| 2010/0020966 A1* | 1/2010 | Hata | H04L 9/0861 380/44 |
| 2010/0033739 A1* | 2/2010 | Phelan | G06Q 30/00 358/1.9 |
| 2010/0034510 A1* | 2/2010 | Oda | G06Q 30/06 386/350 |
| 2011/0044514 A1* | 2/2011 | Rahmes | G06K 9/00067 382/124 |
| 2011/0150327 A1* | 6/2011 | Yoo | G06T 1/00 382/165 |
| 2011/0173452 A1* | 7/2011 | Nan | H04L 9/083 713/179 |
| 2012/0121084 A1* | 5/2012 | Tomlinson | H04L 9/30 380/30 |
| 2012/0121088 A1* | 5/2012 | Hata | H04L 9/0836 380/255 |
| 2012/0201376 A1* | 8/2012 | Kambayashi | H04L 9/0822 380/44 |
| 2013/0094649 A1* | 4/2013 | Tomlinson | H04L 9/304 380/30 |
| 2013/0108105 A1* | 5/2013 | Yoo | H04N 5/272 382/103 |
| 2014/0052996 A1* | 2/2014 | Nin | G06F 21/10 713/189 |
| 2014/0185797 A1* | 7/2014 | Yasuda | H04L 9/008 380/44 |
| 2014/0321643 A1* | 10/2014 | Liu | H04L 9/3066 380/45 |
| 2014/0359276 A1* | 12/2014 | Resch | H04L 63/0457 713/153 |
| 2015/0026479 A1* | 1/2015 | Yi | G06F 21/32 713/182 |
| 2015/0040212 A1* | 2/2015 | Kim | G06F 21/32 726/19 |
| 2015/0055775 A1* | 2/2015 | Choi | H04L 9/0894 380/28 |
| 2015/0163060 A1* | 6/2015 | Tomlinson | H04L 9/304 380/30 |
| 2015/0220717 A1* | 8/2015 | Shin | G06F 21/32 726/28 |
| 2016/0012625 A1* | 1/2016 | Schnelle | G06T 11/60 345/551 |
| 2016/0094548 A1* | 3/2016 | Lee | H04W 12/04 713/186 |
| 2016/0140350 A1* | 5/2016 | Kwon | G06F 21/6209 380/243 |
| 2016/0164867 A1* | 6/2016 | Jung | H04L 63/0861 713/186 |
| 2016/0352520 A1* | 12/2016 | Schwach | H04L 9/3231 |

FOREIGN PATENT DOCUMENTS

| | | |
|---|---|---|
| KR | 10-2012-0047991 A | 5/2012 |
| WO | WO 2011/022212 A1 | 2/2011 |

* cited by examiner

SECURITY VERIFICATION APPARATUS USING BIOMETRIC INFORMATION AND SECURITY VERIFICATION METHOD

CROSS-REFERENCE TO RELATED APPLICATION

This application claims the benefit of Korean Patent Application No. 10-2015-0138044, filed on Sep. 30, 2015 in the Korean Intellectual Property Office, the entire disclosure of which is incorporated herein by reference for all purposes.

BACKGROUND

1. Field

The following description relates to a security verification apparatus using biometric information and a security verification method.

2. Description of Related Art

Recently, security verification apparatuses that verify users by using biometric information such as fingerprints, faces, irises, etc. have been spotlighted.

In addition, mobile devices such as smartphones, tablet PCs, etc. include a payment system that verifies users and is used to purchase goods or perform payment. Such mobile devices may use security verification apparatuses using biometric information such as fingerprints in order to verify users.

Such security verification apparatuses recognize and encode biometric information such as fingerprints through sensors. However, because mobile devices generally lack sufficient high hardware resources, a high level of security, and fast processing are difficult to implement on mobile devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a security verification apparatus is described. The security verification apparatus includes a sensor configured to acquire images of biometric information of a user, and scramble the images of the biometric information by using a received key matrix. The security verification apparatus further includes an information processor configured to generate the key matrix by using a random key, transmit the key matrix to the sensor, decode data of the scrambled images received from the sensor by using the key matrix, and verify the user.

The information processor may include an encoder configured to generate the key matrix by using the random key, a communicator configured to transmit the key matrix generated by the encoder to the sensor, a signal processor configured to perform analog-digital conversion on the data of the scrambled images received from the sensor, and a verifier configured to decode the data processed by the signal processor by using the key matrix and verify the user based on the decoded data. In an embodiment, the encoder is configured to generate the key matrix by further using a public key or a private key.

The sensor may include an imager configured to acquire the images of the biometric information of the user, and a scrambler configured to scramble the images acquired by the imager by using mask patterns based on the key matrix.

The information processor may be configured to generate the key matrix by further using a public key. In an embodiment, the information processor is configured to generate the key matrix by further using a private key.

The biometric information may include unique biometric identifier of the user.

The key matrix may have a variable size.

In another general aspect, a security verification method is described. The security verification method includes generating, by an information processor, a key matrix by using a random key, and scrambling, by a sensor that received the key matrix, images of biometric information of a user by using mask patterns based on the key matrix. The method further includes decoding, by the information processor, scrambled images received from the sensor by using the key matrix, and verifying the user based on data of the decoded images.

The scrambling may include scrambling, by the sensor, the images of the biometric information of the user by using the mask patterns based on the key matrix according to a mathematical replacement arithmetic algorithm. The scrambling may further include transmitting, by the sensor, the data of the scrambled images to the information processor through serial communication.

The scrambling may further include transmitting, by the sensor, the data of the scrambled images in a packet unit to the information processor through serial communication.

The biometric information may include a unique biometric identifier of the user.

The generating of the key matrix may include generating the key matrix by further using a public key or a private key.

The key matrix may have a variable size.

In yet another general aspect, a security verification method is described. The security verification method includes generating, at an image processor, a key matrix using a random key, sharing the key matrix with an imager, encoding images generated at the imager using the shared key matrix, transmitting encoded images to the image processor, and decoding encoded images at the image processor using the shared key matrix.

The encoding images generated at the imager may include scrambling the images using mask patterns based on the key matrix according to a mathematical replacement arithmetic algorithm.

The key matrix may have a variable size.

The generating the key matrix may include using a public key or a private key to generate the key matrix. The imager may include a sensor configured to obtain a unique biometric identifier of a user.

Other features and aspects will be apparent from the following detailed description, the drawings, and the claims.

Figure 1:
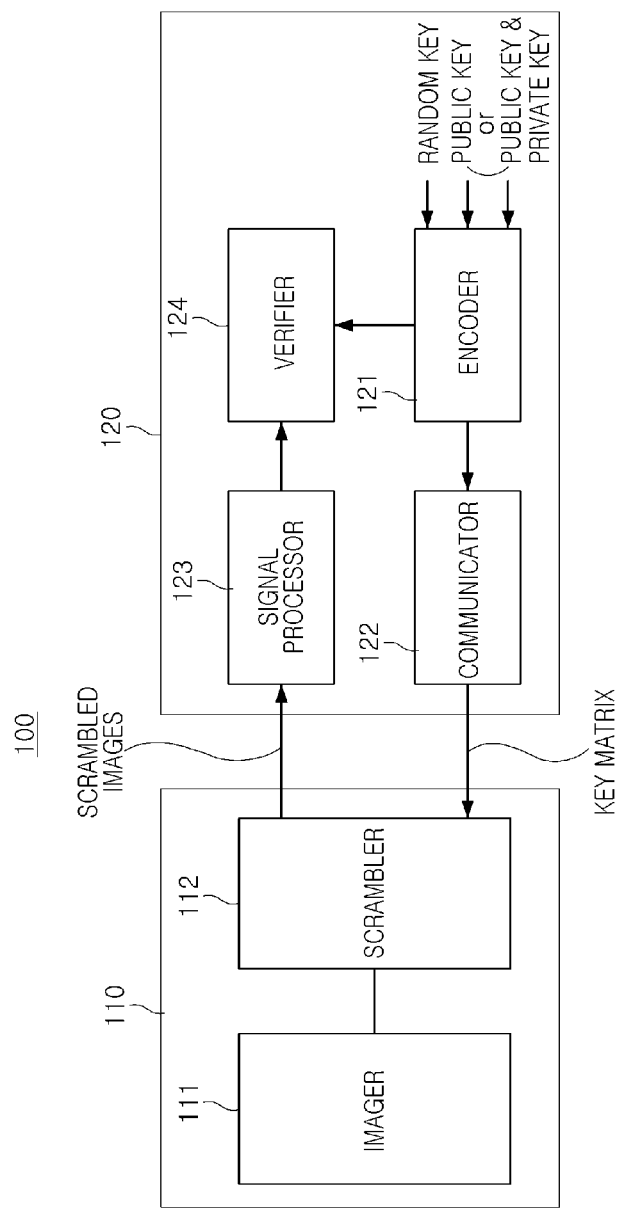
FIG. 1 is a schematic view illustrating a configuration of a security verification apparatus according to an embodiment.

Throughout the drawings and the detailed description, unless otherwise described or provided, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure is thorough, complete, and conveys the full scope of the disclosure to one of ordinary skill in the art.

Unless otherwise defined, all terms, including technical and scientific terms, used herein have the same meaning as commonly understood by one of ordinary skill in the art to which this description pertains. It will be further understood that terms, such as those defined in commonly used dictionaries, should be interpreted as having a meaning that is consistent with their meaning in the context of the relevant art and are not to be interpreted in an idealized or overly formal sense unless expressly so defined herein.

The terminology used herein is for describing particular embodiments only and is not intended to be limiting. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments will be described with reference to figures. In the drawings, for example, due to manufacturing techniques and/or tolerances, modifications of the shape shown may be estimated. Thus, embodiments disclosed herein should not be construed as being limited to the particular shapes of regions shown herein, for example, to include a change in shape results in manufacturing. The following embodiments may also be constituted by one or a combination thereof.

FIG. 1 is a schematic view illustrating a configuration of a security verification apparatus 100 according to an embodiment.

Referring to FIG. 1, the security verification apparatus 100 according to an embodiment includes a sensor 110 and an information processor 120.

The sensor 110 includes an imager 111 and a scrambler 112.

The imager 111 may acquire images of biometric information of a user. The biometric information of the user may include unique biometric identifier such as, for example, a face, an iris image, a retinal image, or a fingerprint. In various embodiments, the imager 111 may include, without limitation, a still or video camera, or a fingerprint sensor. In some embodiments, the fingerprint sensor may be, for example, an optical fingerprint scanner, a capacitive fingerprint scanner, or an ultrasound fingerprint scanner. While some examples of unique biometric identifiers, and corresponding imagers are disclosed herein, the scope of present disclosure is not limited thereto.

The scrambler 112 may scramble data of the images acquired from the imager 111 by using mask patterns. The mask patterns may be generated based on a key matrix transmitted from the information processor 120.

The information processor 120 includes an encoder 121, a communicator 122, a signal processor 123, and a verifier 124.

The encoder 121 generates the key matrix according to a random key. The random key may have a variable size. Accordingly, the key matrix may also have a variable size. In an embodiment, the encoder 121 may generate the key matrix by using a public key or the public key and a private key.

The communicator 122 may transmit the key matrix to the scrambler 112 of the sensor 110.

The signal processor 123 performs analog-digital conversion on data of the scrambled images obtained from the sensor 110. The verifier 124 uses the key matrix generated by the encoder 121 to decode the data of the images from the signal processor 123 and verify the user through the decoded biometric information of the user.

The signal processor 123 may include a non-transitory storage for storing images following the analog-digital conversion.

The encoder 121 may generate the key matrix further by using a public key or the public key and a private key.

In an embodiment, the information processor 120 may be configured as one integrated circuit. The public key may be generated by being differently provided for each supply vendor as a masked key when the integrated circuit is manufactured. The random key may be generated during an initialization of the sensor 110 or the information processor 120. In some embodiments, the random key may be modulated during the initialization. In such embodiments the random key may not be used after rebooting, or if updated before verification of a transaction being performed using the security verification apparatus 100.

The private key may be generated by being differently provided for each system including the security verification apparatus 100 after the integrated circuit is mounted in the system. The private key may be updated during initialization of the system when an initial key is input. In some embodiments, the private key may be transmitted during the initialization of the system by using an intrinsic number owned by the sensor 110. In such embodiments, the private key may prevent circumventing the security verification apparatus by an inappropriate exchange of the sensor 110.

In an embodiment, the key matrix may be a storage that generates and stores a key, and may include a secure memory in which security is maintained.

In other words, the sensor 110 and the information processor 120 may share the key matrix, encode the acquired images of the biometric information, and decode the images during verification, thereby increasing security. Additionally, because the random key has a variable size, the key matrix also has a variable size. Thus, the key matrix has no fixed size, thereby increasing encoding and decoding speed.

Figure 2:
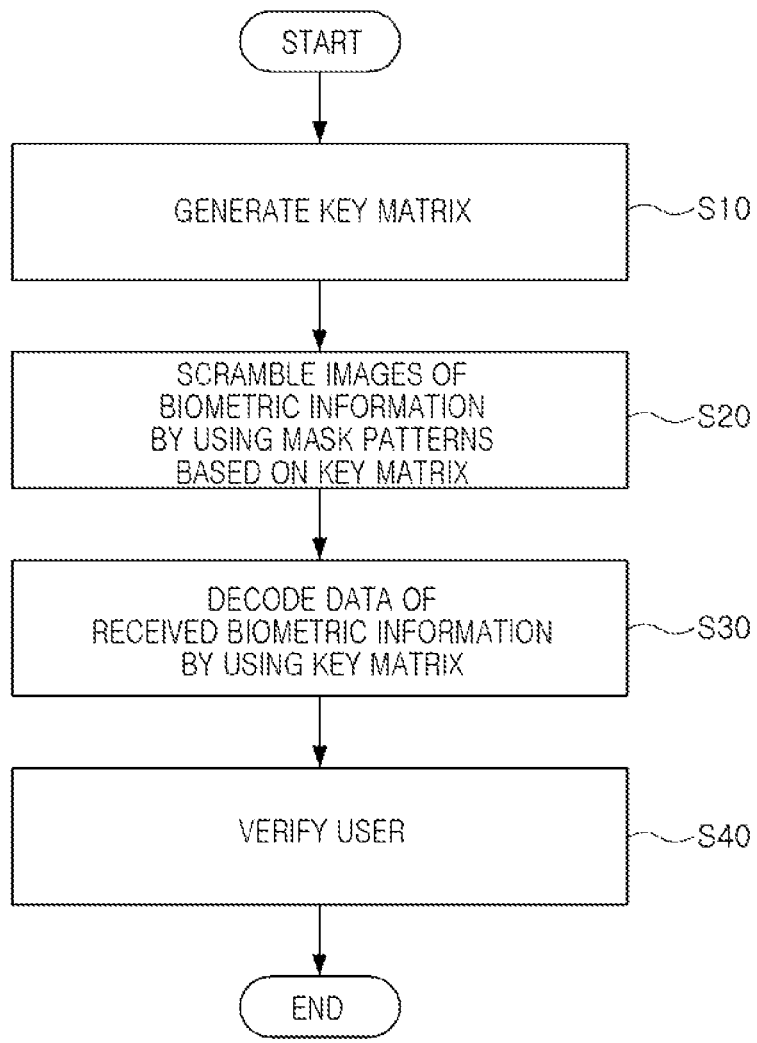
FIG. 2 is a schematic flowchart illustrating a security verification method according to an embodiment.

FIG. 2 is a schematic flowchart illustrating a security verification method according to an embodiment.

Referring to FIGS. 1 and 2, the security verification method according to an embodiment includes, at S10, generating a key matrix. In an embodiment, generating the key matrix includes using a random key and a public key. In some embodiments, generating the key matrix includes using a random key, a public key, and a private key. In an embodiment, the generated key matrix may be transmitted for further processing.

For example, in the security verification apparatus 100, the encoder 121 of the information processor 120 may generate the key matrix and transmit the key matrix to the sensor 110 through the communicator 122.

The security verification method further includes, at S20, scrambling images including biometric information of a user, and at S30, decoding data of the biometric information using the key matrix.

For example, in an embodiment, the imager 111 of the sensor 110 may acquire images of biometric information of a user, and the scrambler 112 may scramble the acquired images by using mask patterns based on the key matrix received from the scrambler 112.

Figure 3A:
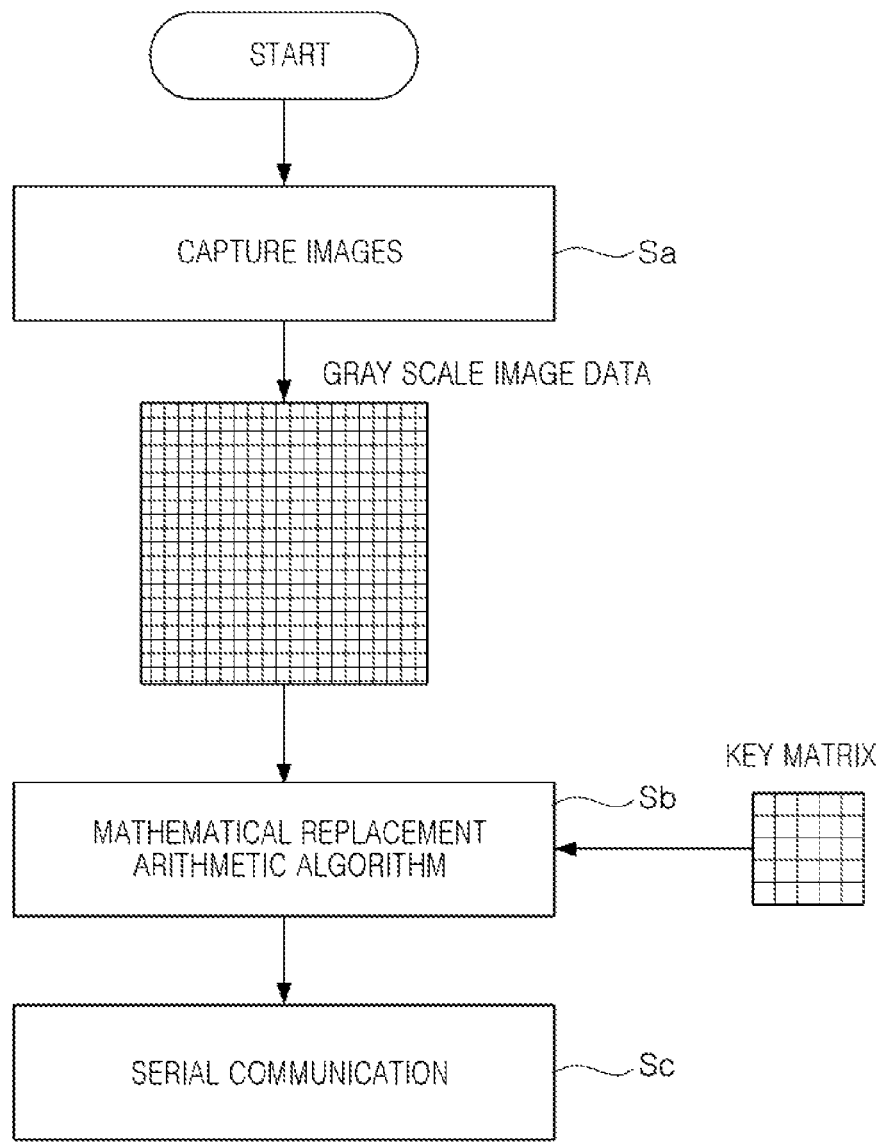
FIG. 3A is a schematic flowchart illustrating an operation of scrambling images of biometric information in a sensor of a security verification apparatus according to an embodiment.
Figure 3B:
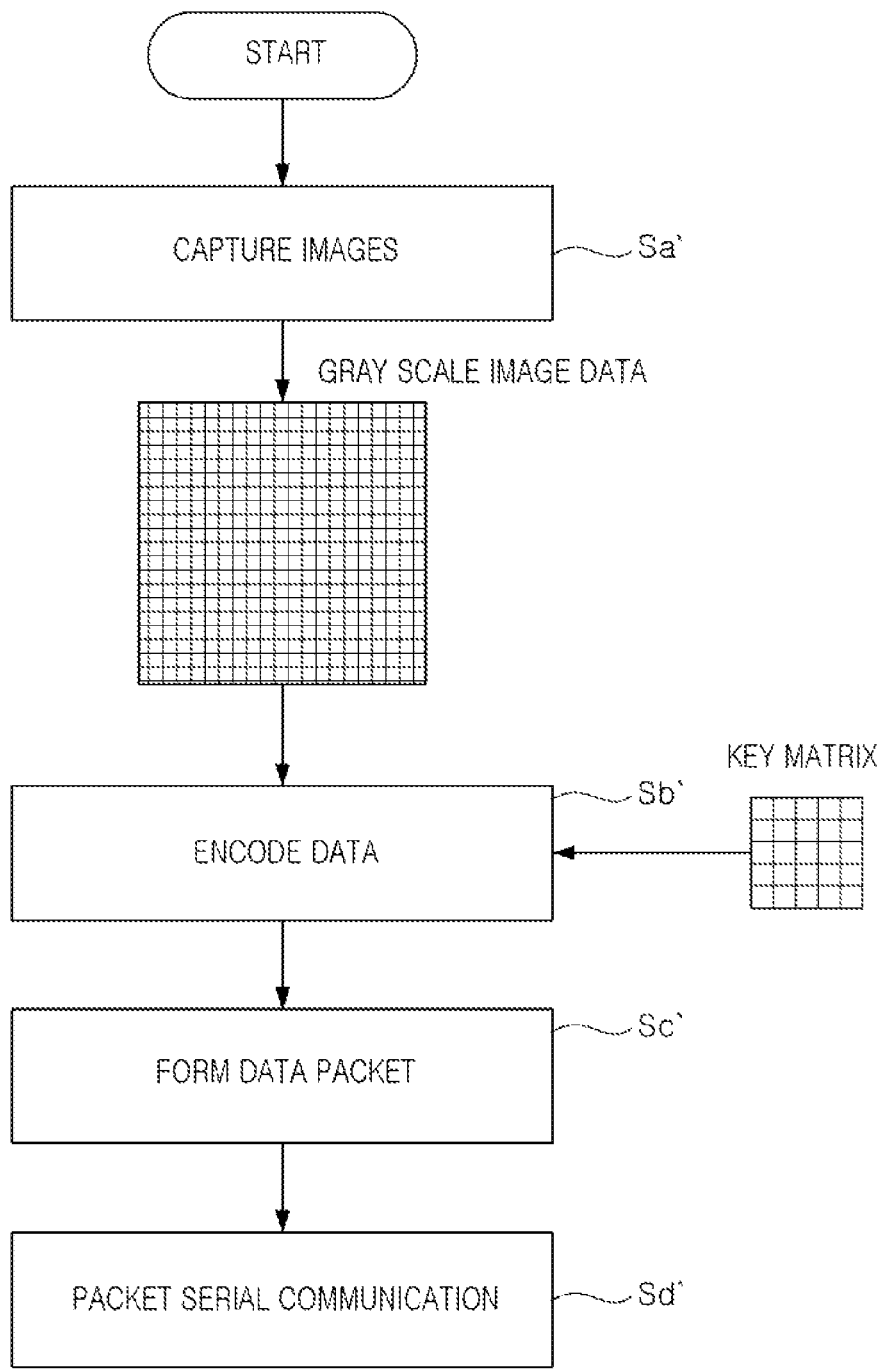
FIG. 3B is a schematic flowchart illustrating an operation of scrambling images of biometric information in a sensor of a security verification apparatus according to an embodiment.

FIG. 3A is a schematic flowchart illustrating an operation of scrambling images of biometric information according to an embodiment. FIG. 3B is a schematic flowchart illustrating an operation of scrambling images of biometric information according to another embodiment.

Referring to FIG. 3A, in an embodiment, the operation of scrambling image of biometric information includes, at Sa, obtaining images of biometric information of a user as grayscale image data, and at Sb, scrambling the grayscale image data using mask patterns based on a key matrix. For example, as in FIG. 3A, the grayscale image data is scrambled, at Sb, according to a mathematical replacement algorithm. The operation further includes, at Sc, transmitting the scrambled data for further processing using a suitable communication method such as, for example, serial communication.

For example, in an embodiment, the imager 111 may acquire images of biometric information of a user, and the scrambler 112 may scramble the acquired images of biometric information of the user by using mask patterns (based on a key matrix) according to a mathematical replacement arithmetic algorithm. Data of the scrambled images may then be transmitted to the information processor 120 through series communication.

In an embodiment, referring to FIG. 3B, the operation of scrambling image of biometric information includes, at Sa', obtaining images of biometric information of a user as grayscale image data, and, at Sb', scrambling the grayscale image data using mask patterns based on a key matrix. The operation further includes, at Sc', converting the scrambled data to data packets, and at Sd' transmitting the data packets for further processing using a suitable communication method such as, for example, serial communication.

For example, in an embodiment, the imager 111 may acquire images of biometric information of a user as gray scale image data (Sa'), the scrambler 112 may then scramble the acquired images of biometric information by using mask patterns (based on a key matrix) (Sb'), and converts the data of the scrambled images to data packets (Sc'). These data packets may then be transmitted to the information processor 120 (Sd') through series communication for further processing.

The security verification method further includes, at S30, decoding the data of the images of the biometric information using the shared key matrix and, at S40, verifying the user based on the decoded data.

For example, in an embodiment, the verifier 124 of the information processor 120 may decode the data of the images of the biometric information received from the scrambler 112 by using the shared key matrix and verify the user based on the decoded data of the images.

In some embodiments, the sensor 110 and the information processor 120 may share a key matrix, encode acquired images of the biometric information, and decode the images during verification, thereby increasing security. Moreover, because a random key has a variable size, the key matrix also has the variable size, and thus has no fixed size. The variable key matrix size has an effect of processing fast encoding and decoding.

As set forth above, according to embodiments, high security and fast encoding and decoding may be implemented.

The apparatuses, units, modules, devices, and other components illustrated in FIGS. or that perform the operations described herein with respect to FIGS. are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described herein with respect to FIGS. may be performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A security verification apparatus, comprising:
   a sensor configured to acquire biometric information comprising image data of a user, and scramble the image data using a received key matrix; and
   an information processor configured to: generate the key matrix using a random key, transmit the key matrix to the sensor, decode the scrambled image data received from the sensor using the key matrix, and verify the user.

2. The security verification apparatus of claim 1, wherein the information processor comprises:
   an encoder configured to generate the key matrix using the random key;
   a communicator configured to transmit the key matrix to the sensor;
   a signal processor configured to perform analog-digital conversion on the scrambled image data received from the sensor; and
   a verifier configured to decode the scrambled image data processed by the signal processor using the key matrix and verify the user based on the decoded data.

3. The security verification apparatus of claim 2, wherein the encoder is configured to generate the key matrix by further using the random key with at least one of a public key and a private key.

4. The security verification apparatus of claim 1, wherein the sensor comprises:
   an imager configured to acquire the images of the biometric information of the user; and
   a scrambler configured to scramble the image data acquired by the imager using mask patterns based on the key matrix.

5. The security verification apparatus of claim 1, wherein the information processor is configured to generate the key matrix using the random key with a public key.

6. The security verification apparatus of claim 5, wherein the information processor is configured to generate the key matrix by further using the random key and the public key with a private key.

7. The security verification apparatus of claim 1, wherein the biometric information comprises a unique biometric identifier of the user.

8. The security verification apparatus of claim 1, wherein the key matrix has a variable size.

9. A security verification method, comprising:
   generating, by an information processor, a key matrix using a random key;
   scrambling, by a sensor receiving the key matrix, image data comprised of biometric information of a user, in which the image data is scrambled using mask patterns based on the key matrix; and
   decoding, by the information processor, the scrambled image data received from the sensor by using the key matrix, and verifying the user based on the decoded image data.

10. The security verification method of claim 9, wherein the scrambling comprises: scrambling, by the sensor, the image data of the biometric information of the user using the mask patterns based on the key matrix according to a mathematical replacement arithmetic algorithm.

11. The security verification method of claim 10, further comprising: transmitting, by the sensor, the scrambled image data to the information processor through serial communication.

12. The security verification method of claim 9, further comprising: transmitting, by the sensor, the scrambled image data in a packet unit to the information processor through serial communication.

13. The security verification method of claim 9, wherein the biometric information comprises a unique biometric identifier of the user.

14. The security verification method of claim 9, wherein the generating of the key matrix comprises: generating the key matrix using the random key with at least one of a public key and a private key.

15. The security verification method of claim 9, wherein the key matrix has a variable size.

16. A security verification method, comprising:
    generating, at an image processor, a key matrix using a random key;
    sharing the key matrix with an imager, wherein the imager comprises a sensor configured to obtain a unique biometric identifier of a user;
    encoding, within the sensor, images generated at the imager using the shared key matrix;
    transmitting encoded images to the image processor; and
    decoding encoded images at the image processor using the shared key matrix.

17. The security verification method of claim 16, wherein encoding the images comprises scrambling the images using mask patterns based on the key matrix according to a mathematical replacement arithmetic algorithm.

18. The security verification method of claim 16, wherein the key matrix has a variable size.

19. The security verification method of claim 16, wherein generating the key matrix is performed using the random key with at least one of a public key and a private key.

* * * * *